(12) United States Patent
McGovern

(10) Patent No.: US 6,608,639 B2
(45) Date of Patent: *Aug. 19, 2003

(54) METHOD OF INPUTTING NAME

(75) Inventor: John McGovern, Iwaki (JP)

(73) Assignee: Alpine Electronics, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,776

(22) Filed: Nov. 9, 1998

(65) Prior Publication Data

US 2002/0067377 A1 Jun. 6, 2002

(30) Foreign Application Priority Data

Nov. 12, 1997 (JP) .............................. 9-310275

(51) Int. Cl.$^7$ ................................. G09G 5/00
(52) U.S. Cl. ........................................ 345/780; 707/3
(58) Field of Search ................................ 345/326, 335, 345/156, 168, 700, 744, 780, 831; 707/3–5, 6, 7, 531

(56) References Cited

U.S. PATENT DOCUMENTS

| | | | |
|---|---|---|---|
| 4,677,450 A | 6/1987 | Ito et al. | 701/212 |
| 4,736,303 A | 4/1988 | Itoh et al. | 701/212 |
| 4,737,927 A | 4/1988 | Hanabusa et al. | 700/200 |
| 4,845,612 A * | 7/1989 | Sakai et al. | 704/7 |
| 4,916,655 A * | 4/1990 | Ohsone et al. | 707/6 |
| 5,140,644 A * | 8/1992 | Kawaguchi et al. | 382/226 |
| 5,799,299 A * | 8/1998 | Fujiwara | 707/3 |
| 5,881,169 A * | 3/1999 | Henry, Jr. | 382/187 |
| 5,952,942 A * | 9/1999 | Balakrishnan et al. | 341/20 |
| 5,973,621 A * | 10/1999 | Levy | 341/22 |
| 5,983,212 A * | 11/1999 | Kataoka et al. | 707/1 |
| 6,012,057 A * | 1/2000 | Mayer et al. | 706/6 |
| 6,038,508 A * | 3/2000 | Maekawa et al. | 701/207 |
| 6,115,669 A * | 9/2000 | Watanabe et al. | 701/209 |

OTHER PUBLICATIONS

Robert S. Boyer and J Strother Moore, "A Fast String Searching Algorithm" vol. 20, pp. 762–772, 1977.*
IBM Technical Disclosure Bulletin, "Multi–Character H–To–Hawaii search Capability," Dec. 1994, US.*
IBM Technical Disclosure Bulletin, "Language–Independent Dictionary Storage and Access Technique," Apr. 1984, US.*

* cited by examiner

*Primary Examiner*—John Cabeca
*Assistant Examiner*—Tadesse Hailu
(74) *Attorney, Agent, or Firm*—Brinks Hofer Gilson & Lione

(57) ABSTRACT

A method of inputting a place name that reduces the necessary memory capacity for input processing. A name list in which a plurality of names are registered in alphabetical order is prepared. A table is also prepared by storing sequences of n leading characters and data related to each sequence of n leading characters. The data represents information as to whether some of the registered names in the name list have the corresponding sequence of n leading characters. When a user inputs one of the sequences of n leading characters, a processor examines whether registered names in the name list have the same sequence of characters as the input sequence of n characters by referring to the table. If none of the registered names have the same sequence, the processor requests the user input a name again. If some of the registered name have the same leading characters as the input sequence of n characters, the processor searches for them from the name list, identifies, from the names searched out, characters each probable to be input as (n+1)th character and characters improbable to input, and displays the two groups of characters so that they are discriminable from each other.

20 Claims, 6 Drawing Sheets

FIG. 2

| ADDRESS | | |
|---|---|---|
| $a_{AAA}$ | PLACE NAMES FORMED OF AAA AND OTHER SUBSEQUENT LETTERS | NLS |
| $a_{AAB}$ | PLACE NAMES FORMED OF AAB AND OTHER SUBSEQUENT LETTERS | |
| $a_{AAC}$ | PLACE NAMES FORMED OF AAC AND OTHER SUBSEQUENT LETTERS | |
| ⋮ | ⋮ | |
| $a_{AAZ}$ | PLACE NAMES FORMED OF AAZ AND OTHER SUBSEQUENT LETTERS | |
| $a_{ABA}$ | PLACE NAMES FORMED OF ABA AND OTHER SUBSEQUENT LETTERS | |
| $a_{ABB}$ | PLACE NAMES FORMED OF ABB AND OTHER SUBSEQUENT LETTERS | |
| ⋮ | ⋮ | |
| $a_{ZZY}$ | PLACE NAMES FORMED OF ZZY AND OTHER SUBSEQUENT LETTERS | |
| $a_{ZZZ}$ | PLACE NAMES FORMED OF ZZZ AND OTHER SUBSEQUENT LETTERS | |

FIG. 3

| SEQUENCE OF THREE LETTERS | EXISTENCE / NON-EXISTENCE (FLAG) OF REGISTERED NAME IN PLACE NAME LIST |
|---|---|
| A A A | " 0 " |
| A A B | " 0 " |
| ⋮ | ⋮ |
| A T L | " 1 " |
| ⋮ | ⋮ |
| Z Z Y | " 0 " |
| Z Z Z | " 0 " |

— SKT

SHADING

METHOD OF INPUTTING NAME

BACKGROUND OF THE INVENTION

1. Field of the Invention

The present invention relates to a method of inputting a name and, more particularly, to a method of inputting one of predetermined names through a key pad input image.

2. Description of the Related Art

In a navigation apparatus provided in a motor vehicle or the like to perform vehicle travel guidance to a selected destination, the current position of the vehicle is detected and map data about places around the vehicle position is read out from a map storage medium (e.g., a compact disc read only memory (CD-ROM) or a digital versatile disc (DVD)) to display a map on a display screen with a vehicle position mark superposed on the corresponding portion of the map. As the vehicle travels and the current position changes, the vehicle position mark on the screen is moved or the map is scrolled while the vehicle position mark is fixed at a predetermined position, e.g., at a center of the screen, thereby enabling a driver to have map information at a glance about places around the vehicle position.

Such an on-vehicle navigation apparatus has a function of inputting a name of a place or a point formed of letters of, for example, the Japanese or English language presented in the order of the kana syllabary or in alphabetical order, and displaying a map containing the point corresponding to the input name. To input a point name, a key pad input image (letter pallet) formed of kana letters or alphabetical letters is displayed on a monitor screen in the order of the kana syllabary or in alphabetical order, and necessary letters are successively designated in the displayed letters to be input.

The function of displaying a map showing places around a selected point by only inputting a name of the point based on this place input method is convenient. However, in the process of inputting a point name from the letters in the order of the kana syllabary or in alphabetical order, it is necessary to search out each of letter keys (kana or alphabet keys) corresponding to the point name and to input the letters one by one. Thus, troublesome inputting operations are required and there is a considerable possibility of an input error.

SUMMARY OF THE INVENTION

An object of the present invention is to provide a method which enables a point name to be input by a simple operation while reducing the necessary memory capacity.

To achieve this object, according to one aspect of the present invention, there is provided a method of inputting one of predetermined names through a key pad input image, the method including the steps of (1) preparing a name list in which a plurality of names formed of alphabetical letters, kana letters, or like characters are registered in alphabetical order or in the order of the kana syllabary, and a table formed by storing sequences of n leading characters and data related to each sequence of n leading characters, the data representing information as to whether some of the registered names in the name list have the corresponding sequence of n leading characters, (2) making, when one of the sequences of n leading characters is input, an examination as to whether some of the registered names in the name list have the same sequence of characters as the input sequence of n characters by referring to the table, (3) searching, according to an affirmative result of the examination step, the name list for some of the registered names whose leading characters correspond to the input sequence of n leading characters, (4) identifying, from the names searched out in the searching step, characters each probable to be input as (n+1)th character and characters improbable to be input as (n+1)th character, and displaying the probable characters and the improbable characters so that the probable characters and the improbable characters are discriminable from each other, and (5) displaying, each time a character is input thereafter, characters each probable to be next input and characters improbable to be next input so that the probable characters and the improbable characters are discriminable from each other.

According to another aspect of the present invention, there is provided a method including forming a table in which (1) each of parent, child and grandchild record is formed by setting characters and bit positions in a one-to-one relationship and by setting a flag at each of the bit positions corresponding to some of the characters each probable to be input in the process of inputting a name, (a) one parent record being formed as a record designating the probability of each of the characters being input as a first character, (b) child records corresponding to the number of the characters being formed, each child record designating the probability of each of the characters being input as a second character subsequent to one of the characters selected as a first character, (c) grandchild records corresponding to the number of possible combinations of first and second characters being formed, each grandchild record designating the probability of each of the characters being input as a third character subsequent to one of the combinations of first and second characters, and in which (2) each of the bits "1" or "0" of all the grandchild records designates the existence or non-existence in the name list of some registered names whose three leading characters correspond to the predetermined sequence of three characters corresponding to the grandchild record bit.

According to still another aspect of the present invention, when the number of names searched out is reduced to one, the one remaining name is displayed and is input by a predetermined key operation.

These and other advantages and embodiments of the present invention will become apparent with reference to the following detailed specification, claims, and accompanying drawings.

BRIEF DESCRIPTION OF SEVERAL VIEWS OF THE DRAWINGS

FIG. 2 is a diagram showing a place name list;

FIG. 3 is a diagram for explaining a skip table;

DETAILED DESCRIPTION OF THE PRESENTLY PREFERRED EMBODIMENTS (a) Configuration FIG. 1 is a diagram showing the configuration of a navigation apparatus to which the present invention can be applied. The navigation apparatus has a map storage medium 11, e.g., a CD-ROM having map information stored therein, a CD-ROM control section 12 for controlling reading of map information from the CD-ROM, and a position measuring unit 13 for measuring the current position of a vehicle. The position measuring unit 13 includes a vehicle speed sensor which detects the distance traveled, a gyroscope for ascertaining the vehicle heading, and central processing unit (CPU) for calculating the position of the vehicle. The navigation apparatus also has a map information memory 14 for storing map information read out from the CD-ROM, a remote controller 15 for operation via the remote control interface 16 and for performing an operation for selection from a menu, an operation for enlargement/reduction, a manual map scrolling and so on. The apparatus further has a processor (CPU) 17 for overall control of the navigation apparatus, a read only memory (ROM) 18 having various navigation control programs stored therein, a random access memory (RAM) 19 for storing processing results, a display controller 20 for generating map images and menu images, a video RAM 21 for storing map images and menu images generated by the display controller 20, a monitor (display) 22 for displaying a menu image, etc., and a bus 23.

In the CD-ROM 11, a place name list NLS in which a multiplicity of place names are registered in alphabetical order is stored. A skip table is also stored in the CD-ROM 11 for recognition as to whether some of the places registered in the place name list NLS have a sequence of certain n (e.g., n=3) alphabetical letters as their leading letters.

(b) Place Name List

FIG. 2 represents the place name list NLS. Place names are registered in alphabetical order from an initial address 000. For example, place names whose first to third letters correspond to an alphabetical letter sequence "AAA" are registered in alphabetical order from address $a_{AAA}$, place names whose first to third letters correspond to an alphabetical letter sequence "AAB" are registered in alphabetical order from address $a_{AAB}$. Other place names are successively registered in the same manner. Finally, place names whose first to third letters correspond to an alphabetical letter sequence "ZZZ" are registered from address $a_{ZZZ}$.

(c) Skip Table

FIG. 3 represents the skip table SKT. A plurality of sequences of n (n=3) alphabetical letters and data items (flags) related to the sequences of alphabetical letters are stored to form the skip table SKT. Each of the data items denotes the existence/non-existence of some place name having the corresponding sequence of n leading alphabetical letters and registered in the place name list NLS.

Figure 4:
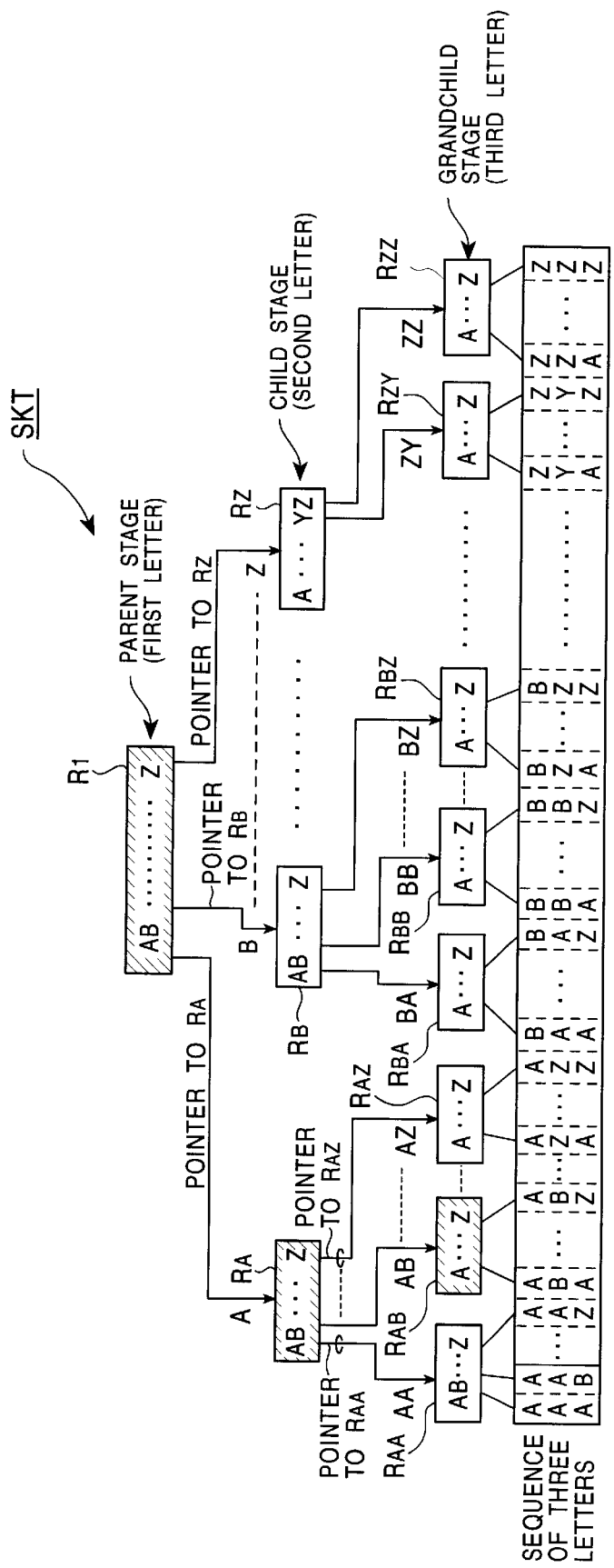
FIG. 4 is a more detailed diagram for explaining the skip table.

FIG. 4 is a more detailed diagram representing the skip table SKT. The skip table SKT has a parent stage using a record $R_1$ which designates a probability or improbability of one of the alphabetical letters being a first letter, a child stage using records $R_A$ to $R_Z$ each of which designates a probability or improbability of one of the alphabetical letters being a second letter, and a grandchild stage using records $R_{AA}$ to $R_{ZZ}$ each of which designates a probability or improbability of one of the alphabetical letters being a third letter. Through these three stages, a list for some of the place names having three leading letters corresponding to three input letters is designated. Records $R_1$, $R_A$ to $R_Z$, and $R_{AA}$ to $R_{ZZ}$ in these stages are formed as described below.

(1) Alphabetical letters each probable to be input as a first letter in a place name input and the other alphabetical letters improbable to be input as a first letter are expressed in a 26-bit record $R_1$ (parent stage). The first bit at the leftmost position in 26-bit record $R_1$ is a letter A position; the second bit, a B position; the third bit, a C position; . . . ; and the twenty-sixth position, a Z position. If it is probable that letter A will be input as a first letter in a place name input, the first bit is set to "1". If it is improbable that the letter A will be input as a first letter, the first bit is set to "0". Determination is made in the same manner with respect to the other twenty-five alphabetical letters, thereby setting each bit to "1" or "0". A pointer to a child record is stored with respect to each of the bit positions in the parent record $R_1$ (bit positions of "1"). A probability of an alphabetical letter being input as a first letter signifies that the alphabetical letter is the first letter of at least one of the registered place names in the place name list.

(2) Alphabetical letters each probable to be input as a second letter subsequent to a first letter in a place name input and the other alphabetical letters improbable to be input as a second letter are expressed in 26-bit records $R_A$ to $R_Z$ (child stage). That is, a record $R_A$ is prepared as a record having "A" as a first letter, and the first bit of the record $R_A$ is set to "1" if it is probable that letter "A" will be input subsequently to the first letter "A" in a place name input. If it is improbable that letter "A" will be input subsequently to the first letter "A", the first bit of the record $R_A$ is set to "0". If it is probable that letter "B" will be input subsequently to the first letter "A" in a place name input, the second bit of the record $R_A$ is set to "1". If it is improbable that letter "B" will be input subsequently to the first letter "A", the second bit of the record $R_A$ is set to "0". Determination is made in the same manner with respect to the other twenty-four alphabetical letters, thereby setting each bit of the record $R_A$ to "1" or "0". Then, a record $R_B$ is prepared as a record having "B" as a first letter. If it is probable that letter "A" will be input subsequently to the first letter "B" in a place name input, the first bit of the record $R_B$ is set to "1". If it is improbable that letter "A" will be input subsequently to the first letter "B", the first bit of the record $R_B$ is set to "0". Determination is made in the same manner with respect to the other twenty-five alphabetical letters, thereby setting each bit of the record $R_B$ to "1" or "0". Subsequently, records $R_C$ to $R_Z$ having first letters "C" to "Z" are formed in the same manner. A pointer to a grandchild record is stored with respect to each of the bit positions in the records $R_A$ to $R_Z$ (bit positions of "1"). A probability of an alphabetical letter being input as a second letter subsequent to a first alphabetical letter signifies that these alphabetical letters are the two leading letters of at least one of the registered place names in the place name list.

(3) Alphabetical letters each probable to be input as a third letter subsequent to first and second letters in a place name input and the other alphabetical letters improbable to be input as a third letter are expressed in 26-bit records $R_{AA}$ to $R_{AZ}$, $R_{BA}$ to $R_{BZ}$, . . . , $R_{ZA}$ to $R_{ZZ}$ (grandchild stage). That is, a 26-bit record $R_{AA}$ is prepared as a record having "AA" as first and second letters, and the first bit of the record $R_{AA}$ is set to "1" if it is probable that letter "A" will be input subsequently to the first and second letters "AA" in a place name input. If it is improbable that letter "A" will be input subsequently to the first and second letters "AA", the first bit of the record $R_{AA}$ is set to "0". If it is probable that letter "B" will be input subsequently to the first and second letters "AA" in a place name input, the second bit of the record $R_{AA}$ is set to "1". If it is improbable that letter "B" will be input subsequently to the first and second letters "AA", the second bit of the record $R_{AA}$ is set to "0". Determination is made in the same manner with respect to the other twenty-four alphabetical letters, thereby setting each bit of the record $R_{AA}$ to "1" or "0". Then, a record $R_{AB}$ is prepared as a record having "AB" as first and second letters. If it is probable that letter "A" will be input subsequently to the first and second letters "AB" in a place name input, the first bit of the record $R_{AB}$ is set to "1". If it is improbable that letter "A" will be input subsequently to the first and second letters "AB", the first bit of the record $R_{AB}$ is set to "0". Determination is made in the same manner with respect to the other twenty-five alphabetical letters, thereby setting each bit of the record $R_{AB}$ to "1" or "0". Subsequently, records $R_{AC}$ to $R_{AZ}$, $R_{BA}$ to $R_{BZ}$, . . . , $R_{ZA}$ to $R_{ZZ}$ are formed in the same manner with respect to sets of first and second letters "AC" to "AZ", "BA" to "BZ", . . . , "ZA" to "ZZ".

The existence/non-existence of some place name registered in the place name list can be ascertained according to whether "1" is set at one of the bit positions of the above-described grandchild records $R_{AA}$ to $R_{AZ}$, $R_{BA}$ to $R_{BZ}$, . . . , $R_{ZA}$ to $R_{ZZ}$ corresponding to the three leading letters of the place name. For example, if a place name "Atlanta" exists, the bit of the grandchild record $R_{AT}$ corresponding to the three leading letters "ATL" is "1".

According to an embodiment of the present invention, as can be understood from the above, the number of records for identifying the sets of three letters in the skip table SKT is a total of 1 in the parent stage, 26 in the child stage and 26×26 in the grandchild stage, and a total table is given by (Table Size)=(Record Size)×(Number of Records).

Since one record is formed of 26 bits, the necessary table size is (Table Size)=26[1+26+26×26]

=26 (bits)×703 (records)

=18278 (bits) or 2285 (bytes).

That is, it is possible to identify a name having a sequence of certain three leading letters as one registered or not registered in the name list by using a table having a small data size of 2285 bytes.

(d) Place Name Input Control

Figure 5:
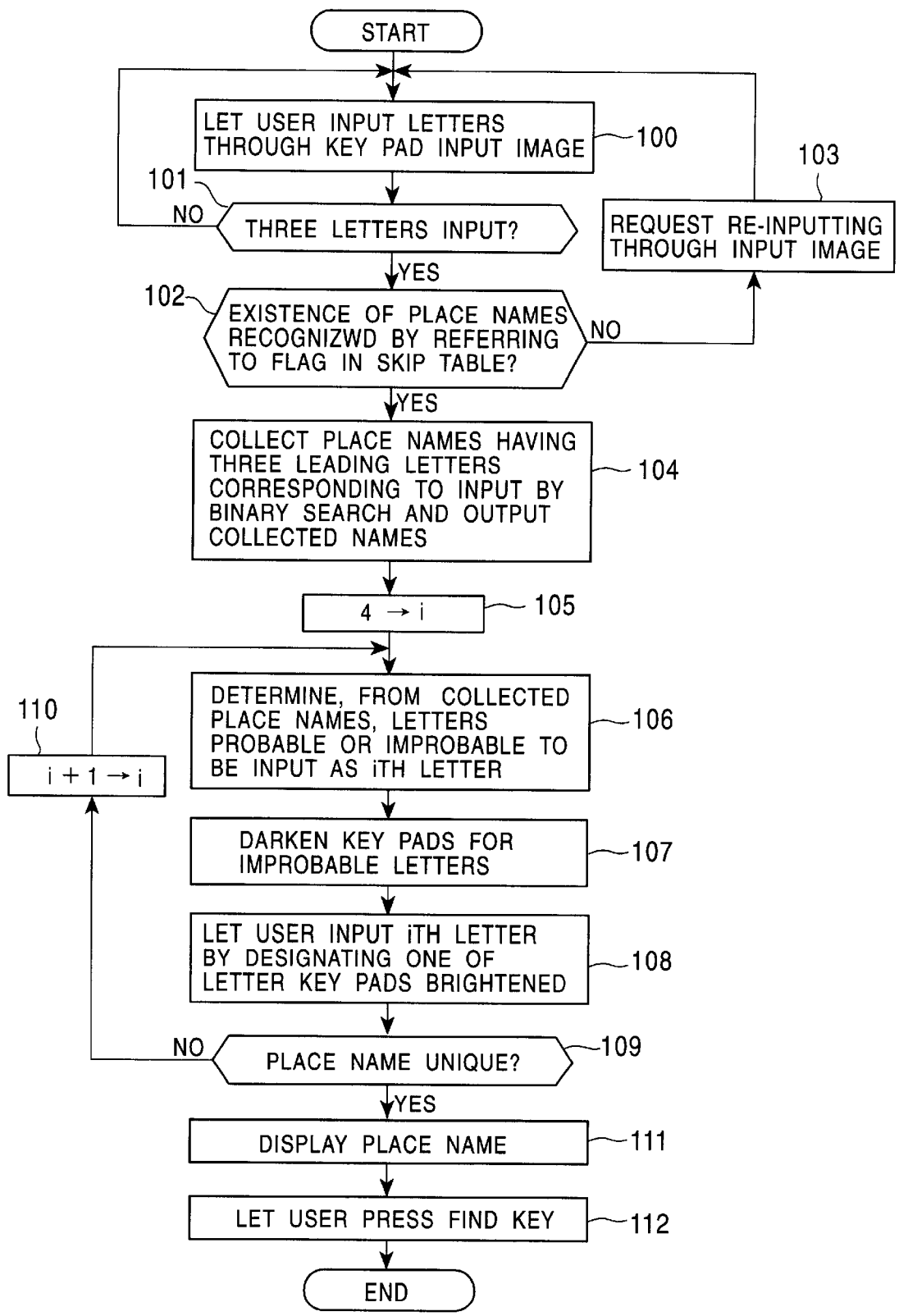
FIG. 5 is a flowchart of place name input control processing.
Figure 6A:
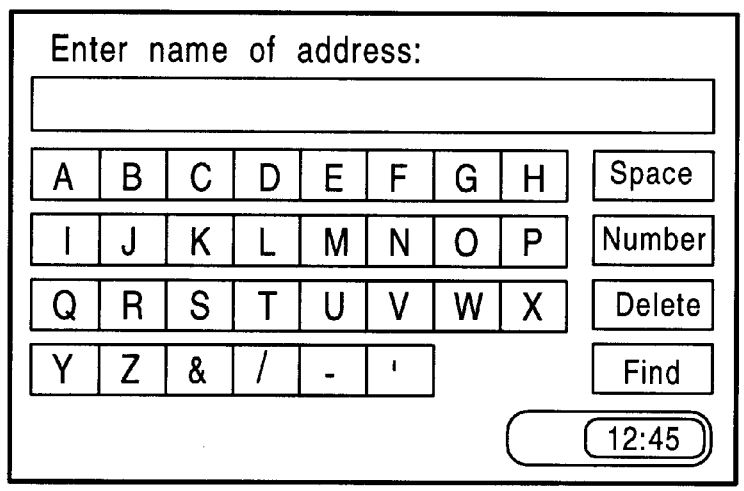
FIGS. 6A and 6B are diagrams showing a key pad input image (letter pallet).
Figure 6B:
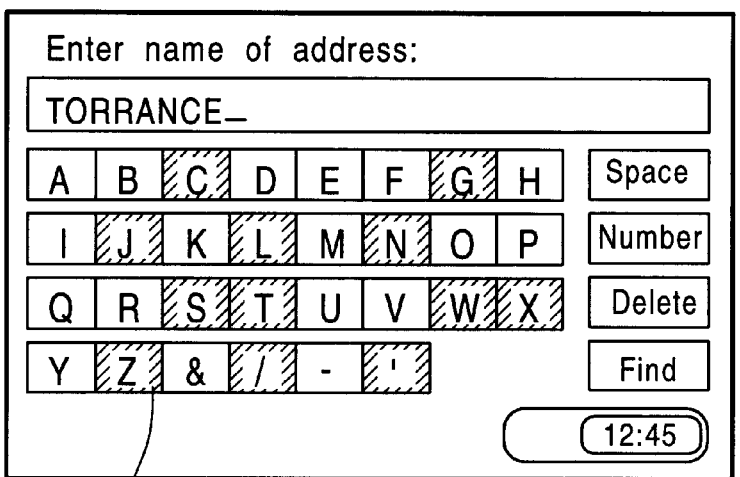

FIG. 5 is a flowchart of place name input control, and FIGS. 6A and 6B are diagrams showing a key pad input image (letter pallet).

Figure 1:
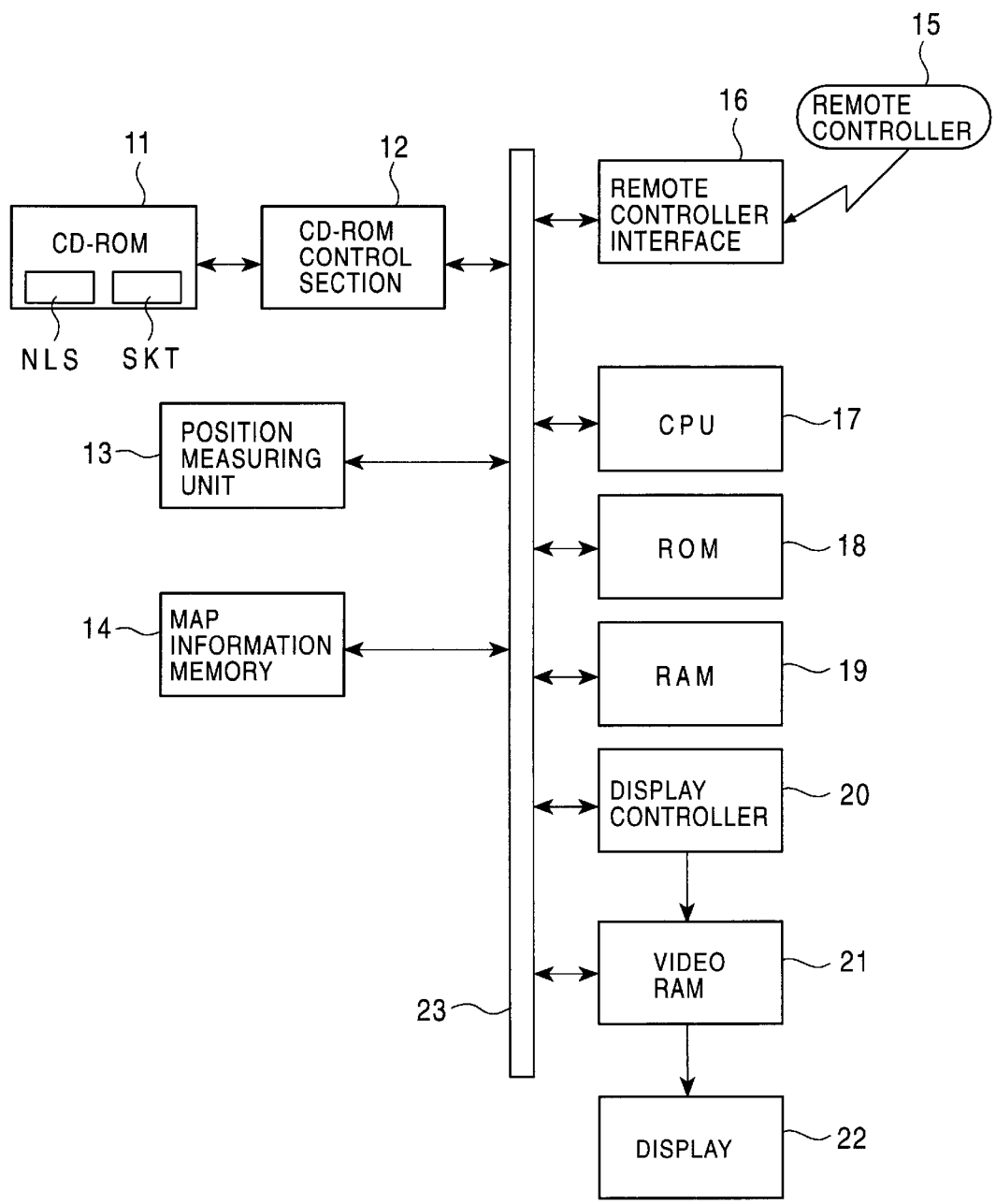
FIG. 1 is a block diagram showing the configuration of a navigation apparatus having a name inputting function.

When a power supply for the navigation apparatus is turned on, the processor 17 (shown in FIG. 1) reads out the skip table SKT stored on the recording medium (CD-ROM) 11 and stores the skip table SKT in the RAM 19 based on a booting program. In this state, a user selects an alphabetical place name input process by a menu operation with the remote controller 15. Then, the processor displays a key pad input image (letter pallet) such as shown in FIG. 6A on the monitor 22.

Next, the user inputs leading letters of a place name one by one by designating alphabetical key pads in the key pad input image (step 100). The processor checks whether three leading letters have been input (step 101). If three leading letters have been input, the processor examines whether the first to third letters at least one of the registered place names in the place name list NLS correspond to the three input letters (step 102). For example, in a case where three letters "AAB" are input, record $R_1$ is first referred to and record $R_A$ is recognized, from record $R_1$, as the next record to be referred to with respect to the second letter (the pointer to record $R_A$ is obtained) since the first letter is "A". From record $R_A$, record $R_{AA}$ is recognized as the next record to be referred to with respect to the third letter (the pointer to record $R_{AA}$ is obtained) since the second letter is "A". Then, since the third letter is "B", the second bit of record $R_{AA}$ is recognized as "1" or "0" to ascertain whether at least one place name whose first to third letters correspond to the three input letters "AAB" exists as one of the registered place names in the place name list NLS.

If "0" is recorded as the bit of the grandchild record corresponding to the three input leading letters, no place name having the corresponding three leading letters exists, and the processor therefore requests the user to again input letters through the image on the display (step 103). Processing through steps 100 to 102 is then repeated.

If "1" is recorded as the bit of the grandchild record corresponding to the three input leading letters, the processor recognizes the existence of some place names having the three leading letters in step 102, makes a binary search for the place names having the corresponding three leading letters in the place name list NLS, reads out the place names searched out, and stores them in the RAM 19 (step 104). Thereafter, the processor sets i to 4 (step 105) and recognizes, in the place names stored in the RAM, alphabetic letters each probable to be input as ith letter and the other alphabetic letters improbable to be input as ith letter (step 106) The processor then reduces the luminance of lighting (shades) for the alphabet keys (key pads) improbable to be operated to input an ith letter while maintaining the luminance of lighting for the key pads probable to be operated for inputting (step 107). FIG. 6B illustrates a case where "TORRANCE" is input as a place name and alphabetic letters each probable to be input after "TORRANCE" are brightly displayed while the other alphabetical letters improbable to be input are shaded. The user can select an ith letter from the bright key pads. Thus, the facility of the ith letter inputting operation is improved and the possibility of occurrence of an input error is reduced.

After the user has input an ith letter (step 108), the processor checks whether there is only one place name whose first to ith letters correspond to the above-described sequence of input letters (whether the input letter sequence has become unique) (step 109). If the input letter sequence is not unique, the processor increments i by one (i+1→i) (step 110) to repeat processing through steps 106 to 108.

If only one place name is searched out whose first to ith letters correspond to the input letter sequence even before being completely input, it is displayed in an upper image section on the monitor screen (step 111), and the user operates a FIND key referring to the display if the displayed name coincides with the name that the user intends to input, thereby completing the place name inputting process (step 112). The arrangement may alternatively be such that processing through steps 106 to step 110 is repeated to input all the alphabetical letters of the target name without performing steps 111 and 112.

Place names each probable to be input by the user are reduced as the inputting process progresses, so that the processor can recognize a reduced number of place names (candidate place names) each of which is probable to be equal to the place name that the user intends to input. The arrangement may therefore be such that, when several candidate place names remain, they are successively displayed at a user's request or automatically, and the user selects and inputs one of the candidate place names.

The present invention has been described with respect to the case of inputting a place name from letters presented in alphabetical order. However, the inputting process of the present invention is not limited to this. For example, the present invention can also be applied to a system for inputting a place name from letters in the kana syllabary or like characters. Also, the present invention is not limited to inputting of place names. The present invention can be applied to a system for inputting many other kinds of names. Furthermore, in the process of the invention, the number n is not limited to 3.

The present invention has been described with respect to what is presently considered to be a preferred embodiment. However, the present invention can be modified and changed on various ways without departing from the scope of the invention set forth in the appended claims, and is to be construed to encompass such modifications and changes.

According to an embodiment of the present invention, as described above, each of a plurality of letters is recognized as probable or improbable to be next input by a user in the process of inputting a place name or the like, and keys corresponding to the letters probable to be input are displayed so as to be discriminable from other keys corresponding to the letters improbable to be input, thereby enabling the user to input the place name by a simple operation with a reduced possibility of an input error.

According to an embodiment of the present invention, each of parent, child and grandchild records is formed by setting letters (alphabetical letters or kana letters) and bit positions in a one-to-one relationship and by setting a flag ("1") at each of the bit positions corresponding to some of the letters each probable to be input in the process of inputting a name, (1) one parent record being formed as a record designation the probability of each of the letters being input as a first letter, (2) child records corresponding to the number of the letters being formed, each child record designating the probability of each of the letters being input as a second letter subsequent to one of the letters selected as a first letter, (3) grandchild records corresponding to the number of possible combinations of first and second letters being formed, each grandchild record designating the probability of each of the letters being input as a third letter subsequent to one of the combinations of first and second letters, (4) each of the bits "1" or "0" of the grandchild records designating the existence/non-existence in a name list of some registered names whose three leading letters correspond to the predetermined sequence of three letters corresponding to the grandchild record bit. From these records forming a table of a small size, it is possible to ascertain whether a registered name having certain three leading letters exists in the name list. If a name not registered in the name list is input by a user, the user is requested to again input a name. Therefore, even if the user makes an error in inputting letters, he or she can immediately recognize the error and can input the necessary name correctly and promptly.

According to another embodiment of the present invention, when the number of names probable to be input is reduced to one, the one remaining name is displayed and input by a predetermined key operation before completing the process of inputting all the letters of the name.

What is claimed is:

1. A method of inputting one of a plurality of predetermined names comprising the acts of:
   providing a name list in which the plurality of names are stored;
   providing a skip table including parent, child and grandchild records, the skip table formed by storing sequences of n leading characters and data related to each sequence of n leading characters that indicates through characters and bit positions in a one-to-one relationship which names in the name list have the corresponding sequence of n leading characters, wherein a flag at each of the bit positions corresponds to whether an inputted character will yield a name in the name list, the parent records designate whether a character inputted as a first character corresponds to a name in the name list, the child records designate whether a character inputted as a second character subsequent to a character selected as a first character corresponds to a name in the name list, and the grandchild records designate whether a character inputted as a third character subsequent to a combination of first and second characters corresponds to a name in the name list;
   receiving input data corresponding to a sequence of n leading characters;
   evaluating whether a name in the name list has the same sequence of characters as the inputted sequence of n characters by referring to the skip table;
   searching the name list for some of the names whose leading characters correspond to the input sequence of n leading characters; and
   identifying characters each probable to be inputted as (n+1)th character;
   and displaying the probable characters.

2. The method according to claim 1, further comprising the act of identifying characters each improbable to be inputted as the (n+1)th character and displaying the improbable characters so that the probable characters are discriminable from the improbable characters.

3. The method according to claim 2 further comprising the act of displaying, each time a character is thereafter inputted, the improbable characters so that the probable characters are discriminable from the improbable characters.

4. The method according to claim 1, further comprising the act sorting the names in the name list in alphabetical order.

5. The method according to claim 1, wherein, if some of the registered names in the name list have the same leading characters as the input n characters, searching the name list by binary search to read out the names having the n leading characters.

6. The method according to claim 1, wherein, when the number of names searched out is reduced to one, displaying the one remaining name and inputting the name by a predetermined key operation.

7. The method according to claim 1, wherein, when a number of candidate names searched out is reduced to a number equal to or smaller than a predetermined number, displaying the candidate names so that a user can thereafter select and input one of the candidate names.

8. The method according to claim 1, wherein, when a number of candidate names searched out is reduced to a number equal to or smaller than a predetermined number, automatically displaying the candidate names so that a user can thereafter select and input one of the candidate names.

9. The method according to claim 2, wherein the characters improbable to be inputted as (n+1)th character are displayed by being lighted at a reduced luminance than the characters probable to be inputted as (n+1)th.

10. The method according to claim 1, wherein, if some of the names in the name list have the same leading characters as the input n characters, searching the name list by binary search to read out the names having the n leading characters.

11. A recording medium comprising;
   a name list in which a plurality of names are registered, and a skip table in which each of parent, child and grandchild records is formed by setting characters and bit positions in a one-to-one relationship and by setting a flag at each of the bit positions corresponding to some of the characters each probable to be input in the process of inputting a name, one parent record being formed as a record designating the probability of each of the characters being input as a first character, child records corresponding to the number of the characters being formed, each child record designating the probability of each of the characters being input as a second character subsequent to one of the characters selected as a first character, grandchild records corresponding to the number of possible combinations of first and second characters being formed, each grandchild record designating a probability of each of the characters being input as a third character subsequent to one of the combinations of first and second characters, each of bits "1" or "0" of all the grandchild records designating the existence or non-existence in the name list of some registered names whose three leading characters correspond to the predetermined sequence of three characters corresponding to the grandchild record bit.

12. The recording medium according to claim 11, wherein the names are registered in alphabetical order in said name list.

13. The recording medium according to claim 11, wherein said skip table includes a storage address in the name list for some sequence of characters whose leading characters correspond to three input characters.

14. The recording medium according to claim 11, wherein each of the records expresses alphabetical letters each probable to be input in a name input, and other alphabetical letters improbable to be input, each of the probable and improbable letters being represented by one bit.

15. The recording medium according to claim 11, wherein a pointer to one of the child records is stored corresponding to each bit position of the parent record.

16. A method of inputting one of predetermined names through a keypad input image, comprising the acts of:

providing a name list on a recording medium in which a plurality of names are stored;

providing a skip table on the recording medium comprising parent, child and grandchild records, said parent, child and grandchild records representing information indicating sequences of at least 3 leading characters that have corresponding names in the name list;

reading the skip table from the recording medium;

storing data from the skip table in a memory;

displaying a keypad input image;

receiving an inputted sequence of n leading characters;

evaluating whether at least one of the names in the name list has the same sequence of n leading characters as the inputted sequence of n characters by referring to the skip table;

searching the name list for at least one name whose leading characters correspond to the inputted sequence of n leading characters;

identifying characters that would yield a name in the name list if inputted as the (n+1)th character; and displaying the characters that would yield a name in the name list if inputted as the (n+1)th character so that they are discernable from characters that would not yield a name in the name list if inputted as the (n+1)th character.

17. The method according to claim 16, wherein, if none of the names in the name list has the same sequence of n leading characters as the inputted sequence of n characters, a user is requested to reinput one or more characters.

18. The method according to claim 16, wherein, if some of the names in the name list have the same leading characters as the inputted sequence of n characters, the name list is searched by binary search to read out the names having the n leading characters.

19. A method according to claim 16, wherein, when a number of candidate names searched out is reduced to a number equal to or smaller than a predetermined number, the candidate names are automatically displayed and a user can thereafter select and input one of the candidate names.

20. A method of claim 16, wherein, when the number of names searched out is reduced to one, the one remaining name is displayed and is inputted by a predetermined key operation.

* * * * *